(12) United States Patent
Whittington et al.

(10) Patent No.: US 9,159,026 B2
(45) Date of Patent: Oct. 13, 2015

(54) METHOD AND APPARATUS FOR MODEL BASED DECISION MAKING

(71) Applicant: MOOD ENTERPRISES LIMITED, York (GB)

(72) Inventors: Dick Whittington, York (GB); Simon Smith, York (GB)

(73) Assignee: Mood International Limited, York (GB)

( * ) Notice: Subject to any disclaimer, the term of this patent is extended or adjusted under 35 U.S.C. 154(b) by 226 days.

(21) Appl. No.: 13/941,041

(22) Filed: Jul. 12, 2013

(65) Prior Publication Data

US 2014/0019402 A1 Jan. 16, 2014

(30) Foreign Application Priority Data

Jul. 13, 2012 (GB) .................................. 1212484.8

(51) Int. Cl.
G06F 9/44 (2006.01)
G06N 7/02 (2006.01)
G06N 7/06 (2006.01)
G06N 5/02 (2006.01)
G06Q 10/00 (2012.01)

(52) U.S. Cl.
CPC . *G06N 5/02* (2013.01); *G06Q 10/00* (2013.01)

(58) Field of Classification Search
USPC ......................................................... 706/52
See application file for complete search history.

(56) References Cited

U.S. PATENT DOCUMENTS

| 6,774,911 | B2 | 8/2004 | Hodgson et al. |
| 7,062,757 | B2 | 6/2006 | Honarvar et al. |
| 7,171,647 | B1 | 1/2007 | Smith et al. |
| 7,668,855 | B2 | 2/2010 | Hodgson et al. |
| 7,689,676 | B2 * | 3/2010 | Vinberg et al. ............... 709/220 |
| 8,204,920 | B2 * | 6/2012 | Smith ........................... 707/827 |
| 8,209,250 | B2 * | 6/2012 | Bradway et al. ............. 705/36 R |
| 8,930,853 | B2 * | 1/2015 | Smith et al. .................... 715/854 |

(Continued)

FOREIGN PATENT DOCUMENTS

WO WO0177872 10/2001
WO WO2009094290 7/2009

OTHER PUBLICATIONS

Several modeling issues in LED, 3D-SiP, and nano interconnects Sheng Liu; Kai Wang; Zhiyin Gan; Xiaobing Luo; Xiaohui Song; Zhaohui Chen; Zongyuan Liu; Han Yan; Wei Wei; Pei Wang Thermal, Mechanical and Multi-Physics simulation and Experiments in Microelectronics and Microsystems, EuroSimE 2009. 10th Intl Conf pp. 1-10.*

(Continued)

*Primary Examiner* — Michael B Holmes
(74) *Attorney, Agent, or Firm* — Head, Johnson & Kachigian, P.C.

(57) ABSTRACT

The invention relates to an organization model and the method of generation of the same and use of the same, wherein the model is provided to be used to assess the current performance of an organization, or part thereof, with regard to its objectives and to guide future decision making by projecting likely future outcomes of proposed changes to the organization, based on cause-effect reasoning which can include a probabilistic layer, said model being constructed in part using available domain knowledge. The model can be also be used to check the validity and success of historical decisions against the current situation, to guide model review and future decision making.

15 Claims, 5 Drawing Sheets

(56) References Cited

U.S. PATENT DOCUMENTS

| | | |
|---|---|---|
| 2004/0236618 A1 | 11/2004 | Smith et al. |
| 2004/0249645 A1 | 12/2004 | Hauser et al. |
| 2005/0004834 A1 | 1/2005 | Smith |
| 2007/0234277 A1 | 10/2007 | Lei et al. |
| 2008/0130605 A1 | 6/2008 | Song et al. |
| 2008/0163164 A1 | 7/2008 | Chowdhary et al. |
| 2009/0138549 A1 | 5/2009 | Huang et al. |
| 2009/0177625 A1 | 7/2009 | Saxena et al. |
| 2009/0254864 A1 | 10/2009 | Whittington et al. |
| 2011/0087614 A1 | 4/2011 | Whittington et al. |
| 2013/0138697 A1 | 5/2013 | Smith et al. |

OTHER PUBLICATIONS

Numerical characterization of electronic packaging solutions based on hidden dies Sommer, J.; Michel, B.; Ostmann, A. Electronic Packaging Technology, 2005 6th International Conference on Year: 2005 pp. 300-306, DOI: 10.1109/ICEPT.2005.1564694.*

Self-Organised Middleware Architecture for the Internet-of-Things Malo, P.; Almeida, B.; Melo, R.; Kalaboukas, K.; Cousin, P. Green Computing and Communications (GreenCom), 2013 IEEE and Internet of Things (iThings/CPSCom), IEEE International Conference on and IEEE Cyber, Physical and Social Computing Year: 2013 pp. 445-451.*

* cited by examiner

METHOD AND APPARATUS FOR MODEL BASED DECISION MAKING

CROSS-REFERENCE TO RELATED APPLICATIONS

This application claims priority to United Kingdom Patent Application No. 1212484.8 filed Jul. 13, 2012 which is incorporated herein by reference.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention is directed towards the development of a method to allow improved and more accurate and effective representation of at least part of an organisation and, in particular, to provide a model which allows improved decision making to be implemented with respect to the organisation represented by the model. It should be appreciated that the term "organisation" is hereonin used to mean an undertaking of some form, which may be an endeavour, an initiative, programme, or a legal entity which is publically or privately owned.

2. Prior Art

Increasingly, and particularly with larger organisations, there is a need for the organisation to be able to deliver against its objectives, and, in order to do so the organisation needs to be able to continually plan, communicate and monitor its operations, performance, and achievement of outcomes. This, in turn, poses a need for confident, collaborative, continual, evidence-based decision making, to be performed throughout the organisation. The ability to make such decisions poses a need for effective understanding of the current situation as it evolves, including identification of critical and imperative aspects, the future options, and the implications of adopting each of those options within the organisation.

The need for effective decision making is particularly important in times of financial and economic constraints where the impact of an incorrect decision can be dramatic on the wellbeing of the organisation at the time of the decision being made and/or in the future. Thus, when the focus on effective use of resources is critical, the need to make the correct decisions, or at least to make decisions based on the most practical and accurate model of an organisation, is a high priority, at all levels of the organisation.

The need to manage decision making is known and is an important strategic discipline. In general, conventional decision management approaches are dominated by two diverse approaches, neither of which, in practice, is satisfactory. In the first case, the instinct of one or more persons, otherwise known as "gut feel" (or "military judgement" as it is called in the defence sector) is used which is based on the belief that senior personnel within the organisation are suitably equipped to take decisions based on their subject matter experience or domain knowledge. Absolute trust in this approach has been shown to be a dangerous strategy, particularly in fast-moving times, where unpredictable factors may be at play. At the opposite end of the decision making management approach is the reliance on historical data which issued to make predictions of future events and for the making of decisions computed from data stores using the identification of correlations and extrapolations. Trust in this purely analytical approach has similarly been shown to be dangerous due to the risk of "conditioning on the data", which enhances convenience but at the cost of accuracy: i.e. it is possible that important contributing factors are omitted from analysis simply because they are not reflected in the currently available data and that the reliability of using historical data in relation to future events which may be exposed to different parameters is shown to be poor.

Known systems which utilise enterprise architecture and modelling are described in patent documents WO0177872, US2004249645 which disclose the concept of enterprise modelling, but assume that the model is structural and is used for generation of software applications (in this case, relating to process control) rather than as a basis for the broad understanding of business and incorporation of performance aspects to provide decision support beyond software design. The use of performance modelling and optimisation is disclosed in patent documents US2007234277, US2008163164, and US2009138549, all of which address the modelling of performance measures for purposes of business decision making, but lack inclusion of enterprise architecture concept to give context and depth to performance considerations. Typically there is no ability to drill down through current performance to investigate contributing business process and associated services.

It is also known from WO2009094290 to include the concept of business modelling with integrated performance aspects, but this does not deal with the breadth of enterprise such that they do not address business process, and/or organisational accountabilities and therefore provide a more formal model to support more mathematical optimisation approach around objectives and constraints. The patent document US2009177625 addresses the concept of query mechanisms to extract complex data sets from information systems, but do not seek to align the results with a general enterprise business model. It is also known to provide systems to provide models of organisation without any dynamic input.

Other patents such as US20080130605 address specific aspects of rule formulation that are relevant to the method described herein, but such patents do not specify any wider method within which rules might be embodied. There are also systems, such as that disclosed in U.S. application Ser. No. 10/434,344, which describe a complete software framework for automated decision management. Such approaches focus on the underlying software architecture for decision execution, without addressing the question of how the decision space is formulated. The applicant's co-pending application US20110087614 discloses a system whereby a model of the organisation can be developed and the users of the model are able to access the model in a manner so as to obtain different viewpoints of the organisation via the model which make the model, and the results obtained from use of the same, more relevant to the user.

The aim of the present invention is therefore to provide a system for allowing informed and reliable decision making to be achieved by means of reference to a model which provides a more accurate and realistic representation of the organisation in relation to which the decisions are to be made. A further aim is to provide a system by which the model can be generated, and continually pr periodically adapted, in a reliable manner to represent the organisation accurately.

SUMMARY OF THE INVENTION

In a first aspect of the invention there is provided a model representing at least part of an organisation, said model comprising a plurality of interconnecting layers of information including a first, base, layer or layers which include the identity of different aspects of the organisation and elements and/or properties relating to the performance of the same, said layer including data retrieved from one or databases of the organisation and/or external database sources and allocated to one or more of the aspects, elements and/or properties and wherein there is provided at least one further layer which includes information identifying the causal links between the said aspects, elements and/or properties identified in the said first layer said casual links developed with reference at least partially to information obtained from one or more human resources.

Typically the data is retrieved continually from the said databases and the data input to the model to update the same.

In one embodiment a yet further layer is provided, said further layer including information relating to the probability of identified links occurring and/or indicating the relative importance of said links. Typically the said further layer allows the input of variables to identify the relative degrees of probability.

Typically the aspects and/or elements of the organisation are provided with a series of properties and one or more linkage paths are identified between the aspects, elements and/or properties such that the links in terms of their implementation and operation within the organisation are mapped, at least in the first layer. Typically the first layer acts as a meta model layer which is used to provide the structure for the model and which includes, for each aspect, a list of any, or any combination of, the elements, properties of those elements, boundaries and/or links between the same which allow the aspects to be performed. Typically, for each aspect there is provided a number of elements which are identified as being critical to decisions which will subsequently be made with regard to the aspect and for at least some of the elements a list of properties which allow the elements to be achieved and these are populated and refreshed, typically continually but alternatively periodically, with data obtained from the organisation and/or sources external to the organisation in order to provide lead indicators and extrapolated lead indicators. Most typically the data which is used is data which is representative of the historical performance of the organisation in terms of aspects of the organisation, elements and/or properties and/or historical data obtained from external sources.

In one embodiment, the next layer of the model includes information which is believed to have a possible impact on each of the aspects and/or elements and which could cause the aspects or elements thereof to act in a particular way either because they always will act in that way or are predicted to act in that way alone or when influenced by another aspect, element or property of the organisation and/or occurrences outwith the organisation.

Preferably this layer includes information allocated to specific aspects, elements and/or properties to provide an indication of the causal effect between the aspects, elements and/or properties. Typically the information is obtained from subject matter experts and/or domain knowledge relating to all and/or particular aspects of the organisation and/or on properties external to the organisation which are believed to have possible influence on the causal effects and which should be taken into account at this level.

Typically a yet further layer includes the use of analytical methods, such as Bayesian methods, to provide a probability of the aspects, elements and/or properties identified in the previous layers occurring and/or having any impact on the organisation represented by the model whilst, typically, taking into account other aspects and/or external influences. For example, the probability of a particular link having a major impact may be 90% if a first amount of money is spent implementing the same and only a 60% chance of successful impact if half the amount of money is spent on implementing the same.

In one embodiment there may be provided two or more variations of the model, said variations developed with reference to two or more identified conditions which may be conditions internal to the organisation, such as for example, a first variable for an organisation that has funds to expand, and a second variable for an organisation which is required to cut costs. Variations may also be developed with respect to conditions which are external to the organisation such as, for example, a first condition in which the country in which the organisation is based is at peace and a second condition in which the country is at war. Further variations could be developed with regard to, for example, different climatic conditions which could arise, different funding possibilities and so on, with the particular conditions which are deemed relevant depending upon the particular organisation and the sectors in which that organisation operates.

Typically the model can be accessed and viewed at different levels and with a user selected degree of granularity and is most typically provided as a web application to approved users within the organisation.

In a further aspect of the invention there is provided a method for creating a model of at least part of an organisation to allow decision making to be performed with respect to said at least part of the organisation represented by the method, said method comprising; assembling at least a first layer of the model in the form of a meta model to describe the aspects, elements and/or properties relevant to said at least part of the organisation, populating the said aspects, elements and/or properties using data obtained from database sources within and/or external to the said at least part of the organisation, identifying links between said aspects, elements and/or properties so as to identify which have an influence on the performance of each other and wherein at least one further layer is developed for the model, said further layer identifying causal effects between said identified linkages based, at least partially on information obtained from subject matter experts and/or domain knowledge.

In one embodiment the further layer relates to key causal links and applicable business rules within and through the aspects, elements and/or properties.

In another embodiment a further layer is generated which indicates the probabilistic likelihood of linked events occurring. Typically both of these layers are implemented in the model.

Typically the first layer is developed using an architectural modelling environment, and assembles an Enterprise Business Meta-Model that describes the relevant domain in terms of the types of aspect (business objectives, activities, functions, risks, projects, systems, locations, interfaces, etc) and their interconnections, including measures of effectiveness. Typically the said layer is populated with data, where appropriate, drawn and typically continually, but alternatively periodically refreshed and synchronised from current data sources across the organisation. Typically this layer, and the integrity of the information contained therein is underpinned by the first layer on the basis of historical data.

Typically the graphical viewpoints of the one or more further layers will automatically refresh in line with changes in synchronised data sources.

Typically the information used to populate the said one or more further layers is drawn from any, or any combination of domain knowledge and/or subject matter experts in the areas of knowledge to which the model relates and/or are drawn from current data sources across the organisation.

Typically the layers and graphical viewpoints of the model are made available to communities of users, to support the decision management requirements of the domain, including option identification and analysis and to allow predictive outputs to be generated in terms of the impact of specific scenarios on the ongoing performance of the organisation as developed by the model.

Typically, each successive layer within the method of the invention brings a new collection of insights to decision makers, enabling increasingly confident decisions over a complex domain landscape. This combination of insight, aligned dynamically with current and relevant data, brings a number of benefits to decision makers across the domains of the enterprise to which the method is applied. The invention also allows an understanding and updating of the structure, interactions and behaviour of the domains, including the composition of any component in terms of contributing elements as the use of the model allows predictive outcomes to be generated not only on the basis of historical data but also on the basis of the knowledge from experts in the field to which the model relates. This therefore ensures that the conventional problem of only using historical data to determine future results is avoided.

In one embodiment the method includes the use of the model to define a specified scenario relating to at least one, but more typically a plurality of interconnected aspects, elements and/or properties of the organisation and said model provides a predicted outcome in response to the request. In one embodiment the actual outcome of the scenario requested is monitored and compared to the predicted outcome and differences between the same are assessed and/or used as further information to be entered as data into the model.

Typically, the invention can be used to assess the current performance of the enterprise, or any selected component, against its objectives, confident that the information gives the best current view available, and in another embodiment the invention can be used to check the validity and success of the decisions that were made historically against the current outcomes, and this information can also be input as a parameter into the model to guide future decision making. Typically the invention allows the review of the current situation (structural or performance) from alternative viewpoints of the organisation and, in one embodiment, by changing parameter selection, a focus on specific detailed aspects can be achieved, such as, for example, a particular geographic region or time period.

In another embodiment causal flows can be exploited to identify principal aspects, elements and/or properties to be changed to bring about required effect.

In one embodiment the identification and investigation of implications of specific options for change, can be performed with increased confidence of mitigating unforeseen effects through the links between the aspects, elements and/or properties and the use of information in addition to historical data as, in many cases the historical data alone may not be relevant to the request made of the model. This allows the exploitation of evidence or information about the likelihood of inter-connected events and connections to ascribe levels of confidence to alternative change proposals.

Typically changes can be made to the model and all affected aspects, elements and/or properties are updated consistently, to inform subsequent decision making.

BRIEF DESCRIPTION OF THE DRAWINGS

Specific embodiments of the invention are now described with reference to the accompanying diagrams; wherein.

DETAILED DESCRIPTION OF THE PREFERRED EMBODIMENTS

Figure 1:
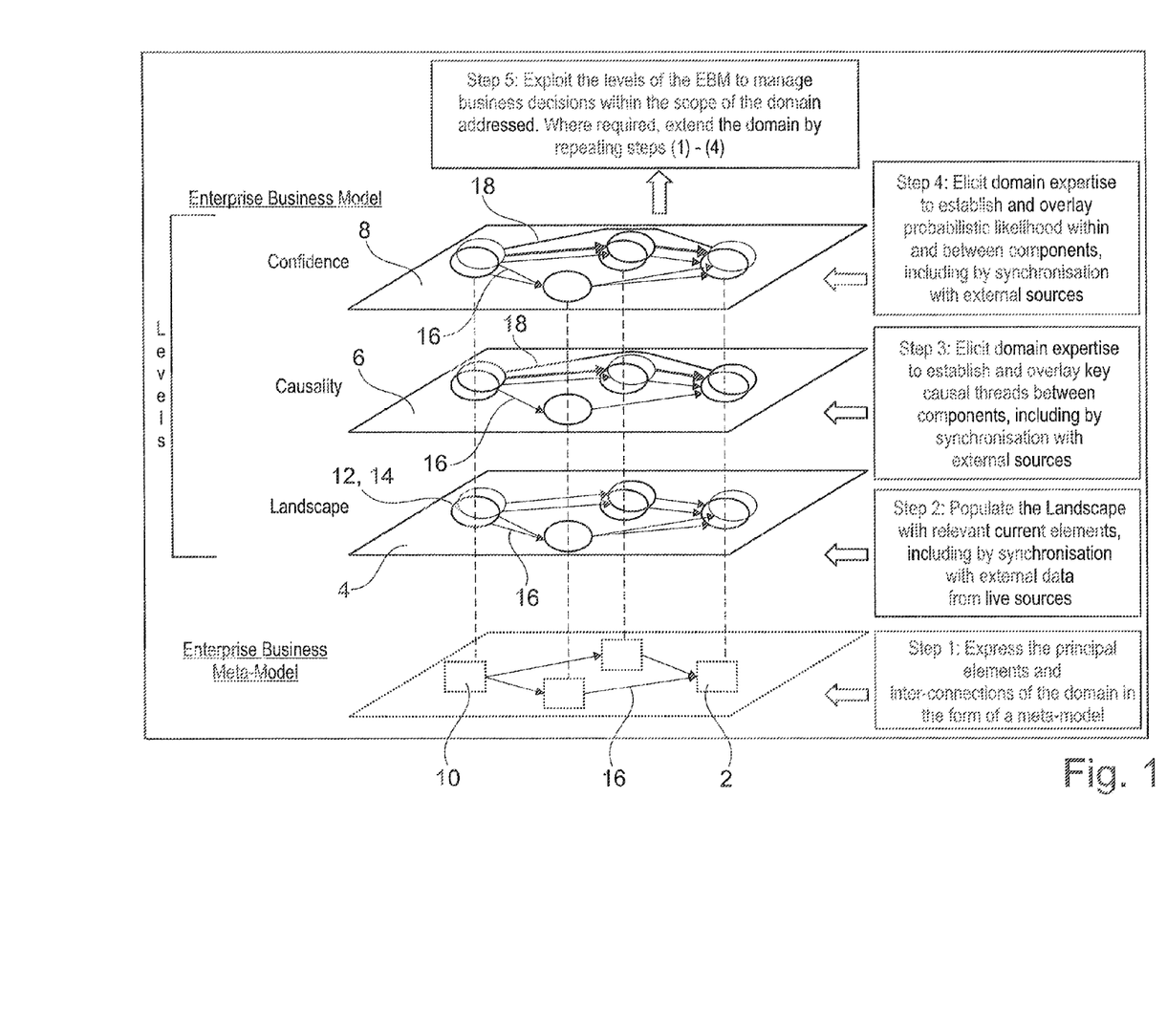
FIG. 1 is a schematic illustration of a model system in accordance with the invention in one embodiment.
Figure 2:
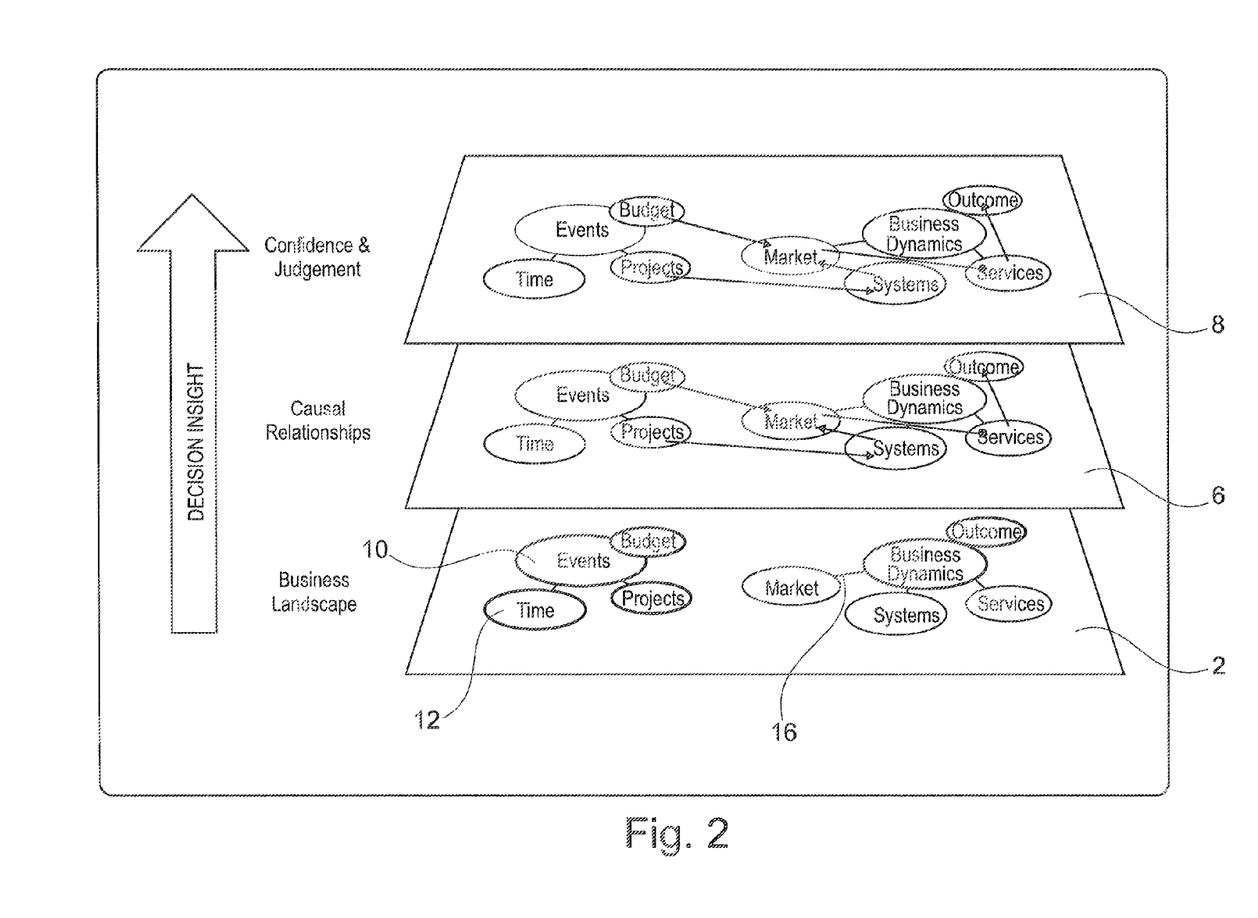
FIG. 2 illustrates a schematic illustration of a model system in accordance with the invention in a second embodiment.

In accordance with the invention there is provided a multi layer model as shown in the FIGS. 1 and 2. In both figures there is provided a first layer 2 referred to as the Enterprise Business Meta Model. In FIG. 1 there is provided a second layer 4, referred to as the Landscape layer which, in FIG. 2 is integrated with the first layer. In both FIGS. 1 and 2 there is provided a further layer 6 which indicates the casual links between the aspects, elements and properties identified in the previous layers and a yet further layer 8 which indicates the probability of aspects elements and/or properties, events related to the same and/or links identified in the previous layers, occurring.

The model is configured to meet the decision management needs of an organisation, using the methods described herein, to provide a model which, when used, allows results to be provided which utilises current and historical data while also taking into account information obtained from domain experts and utilising their knowledge and experience, and which applies mathematical reasoning methods, and powerful graphic visualisation techniques.

Figure 3:
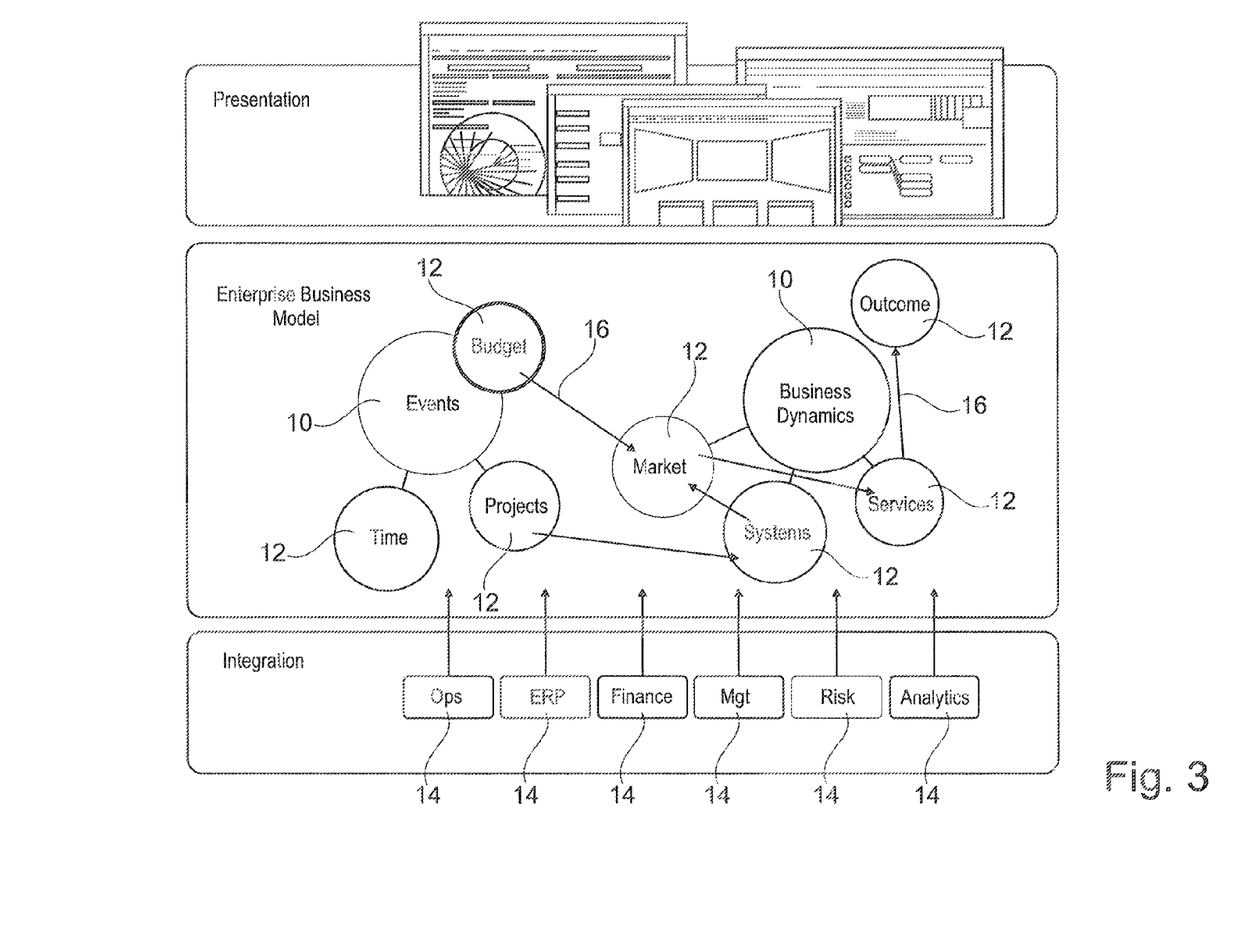
FIG. 3 illustrates an example of aspects, elements and properties which are developed in the first layer for an organisation in accordance with one embodiment.

The first layer 2,4 identifies the aspects 10, elements 12 and/or properties 14 that contribute to the decision management domain, for example, the aspects 10 of Capabilities, Services, Threats, Incidents, Initiatives, of the organisation which is to be modelled, the elements 12 of the organisation which are required to be used in order to define the aspects, and the properties 14 of the organisation which are required to be utilised in order for the elements and hence aspects of the organisation to function. In addition, links 16 are identified between aspects 10, elements 12 and/or properties 14 so as to identify, for example, properties which may be relevant to more than one element. FIG. 3 illustrates an example of such a layer 2,4 which has been developed for an organisation in which a series of aspects 10 identified as events and business dynamics are provided. Elements 12 which have an influence on these aspects are identified as "Time, Projects budgets, market, systems, services and outcome" and linkages 16 are identified between them as indicated so that the impact of one element on another is mapped and taken into account in the use of the model. A list of properties 14 used to determine the values is also provided which in this case are "Operations, ERP, Finance, Management, Risk and analytics". The subject matter of the layer 4 can be provided separately as indicated in FIG. 1 or integrated into the layer 2 as indicated in FIG. 2. In either case, data from the organisation and/or external sources is used to populate the aspects 10, elements 12 and/or properties 14 to make them active with respect to the organisation and reflect the current and/or historical performance of the organisation in relation to the identified aspects, elements and/or properties. The provision of the data may be synchronised in part to current and/or historical data sources from the organisation and/or externally of the organisation wherein information about these elements are managed; e.g. current incidents that have occurred, and the initiatives triggered in response. A range of decisions are supported directly through this level, e.g., around planning of future resourcing needs based on observed Incident trends. This level therefore describes the organisation in terms of its content and connections.

The next level 6 of the model allows the addition of causal i.e. cause-effect, relationships between the already identified links 16 and/or new links 18 between the aspects 10, 12, 14, elements and/or properties across these structures so as to represent the organisation in terms of both the known data but also on the basis of human expert knowledge, herein referred to as domain knowledge, from experts in terms of what they "believe", based on their knowledge of the organisation or aspects of the organisation, will occur in certain scenarios and with regard to the identified links 16,18 between aspects 10, elements 12 and/or properties 14. This allows a more sophisticated range of decisions that relate to contribution to outcome, e.g., proactive Incident planning to minimise the impact of Threats and hence maximise continuity of Services. This level can also synchronise with live data sources across the organisation, e.g. assessments or measures of contribution.

The next level 8 allows the allocation of probabilistic values that represent the likelihood of specific events, i.e. those predicted through linkages 16,18 of the aspects 10, elements 12 and/or properties 14 in the previous layers, actually occurring. This layer can be generated using mathematical techniques (e.g. Bayesian inference) to enable a yet more advanced range of decisions that relate to degrees of confidence around respective options, e.g. in which collection of potential initiatives should an organisation invest to give greatest confidence that a guaranteed minimum level of service can be achieved and/or with reference to domain knowledge and subject matter experts. Again, in reaching these probabilities reference may be made to external sources of data, e.g. around statistical observations or assumptions.

In the use of the model a user can make a request of the model as to the outcome of a specific scenario which is within the range of the model. For example, if the model includes an aspect 10 relating to recruitment and the elements 12 and properties 14 which impact in the success or failure of recruitment by the organisation, the first layer 2 will include those aspects, elements and properties which are known to be linked and have an impact on the recruitment process, such as recruitment events, advertising, promotion and the like. The same or next level 4 will already be populated with data relating to what has historically occurred when recruitment was previously performed and what is being performed at that time. In accordance with the invention the next layer 6 will include cause-effect information based on domain knowledge which may, for example, be provided by internal and/or external recruitment consultants. In one example, they may have identified that there is a particular pool of skilled persons available and suitable for recruitment by the organisation in a specific geographical area due to redundancies from a competitor organisation. The next level 8 can then include a probabilistic indication which could be as a result of a combination of the domain knowledge in the form of a recruitment consultant indicating whether or not they believe that the possible employees will move to the organisation from their geographical location and data which may be obtained which indicates the percentage of a population which is prepared to move geographically to obtain a job. With this information provided, when the user makes a request of the model to identify what will happen, for example, if they stage a recruitment event in the identified geographical area, the user will receive a result from the model which will indicate whether or not the staging of the recruitment event is likely to be of value and the level of the value. This can then be compared, for example, with the result of a further request with regard to staging the recruitment event in a different geographical area to allow a decision to then be made by the user as to the most effective use of their resources for recruitment. This would not be possible in conventional models which are based only on data relating to the historical or current operation of the organisation.

Figure 5:
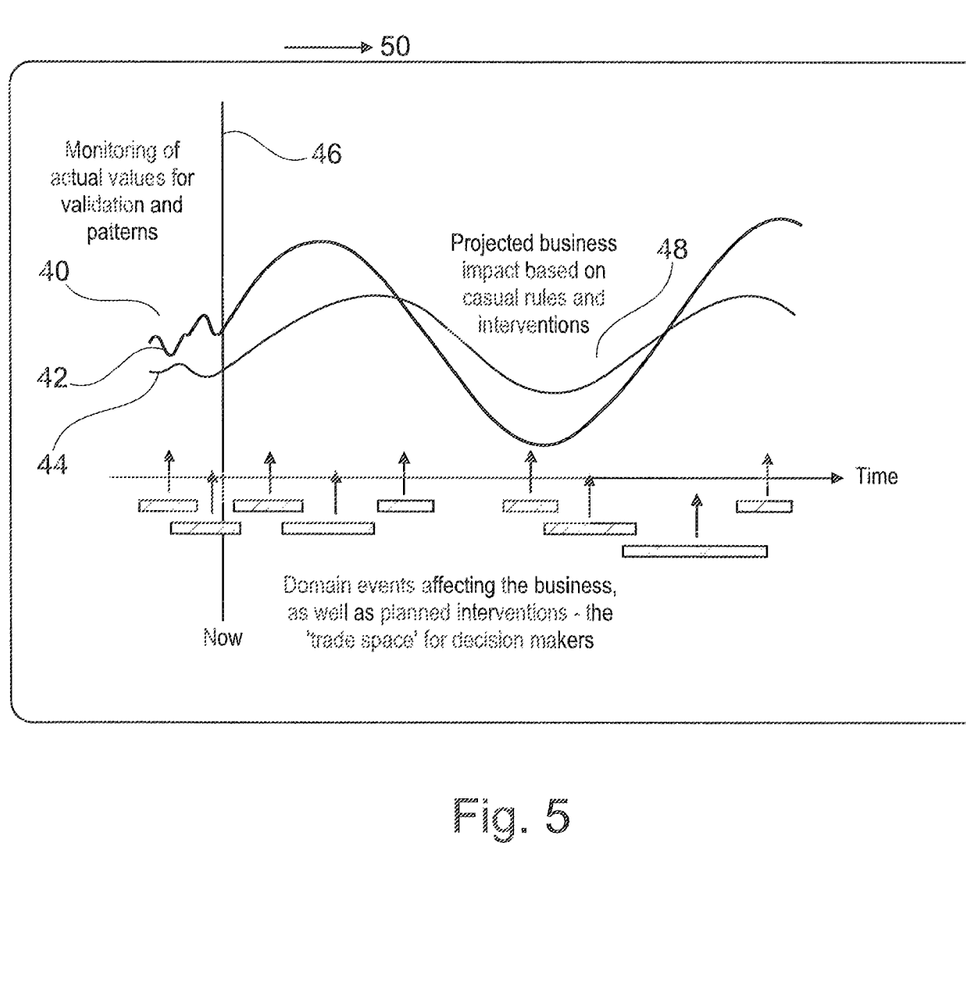
FIG. 5 illustrates, graphically, use of the model in accordance with the invention.

In addition, and as indicated in FIG. 5, a graphical representation can be created to indicate the historical performance of the organisation as indicated by sector 40 and which indicates the actual performance by line 42 and the predicted performance by line 44. The line 46 indicates the instant of time and in the area 48 there is indicated the predicted performance from the query made of the model. As time passes the line 46 moves in the direction 50 and the line 42 indicating actual performance, although shown in area 48 for illustration purposes, will, in practice be generated and advance along with the movement of the line 46 to reflect the actual performance of the organisation in relation to the particular event. A comparison can then be performed between the actual and predicted performances and any discrepancies analysed and the data then entered into the model as historical data.

Figure 4:
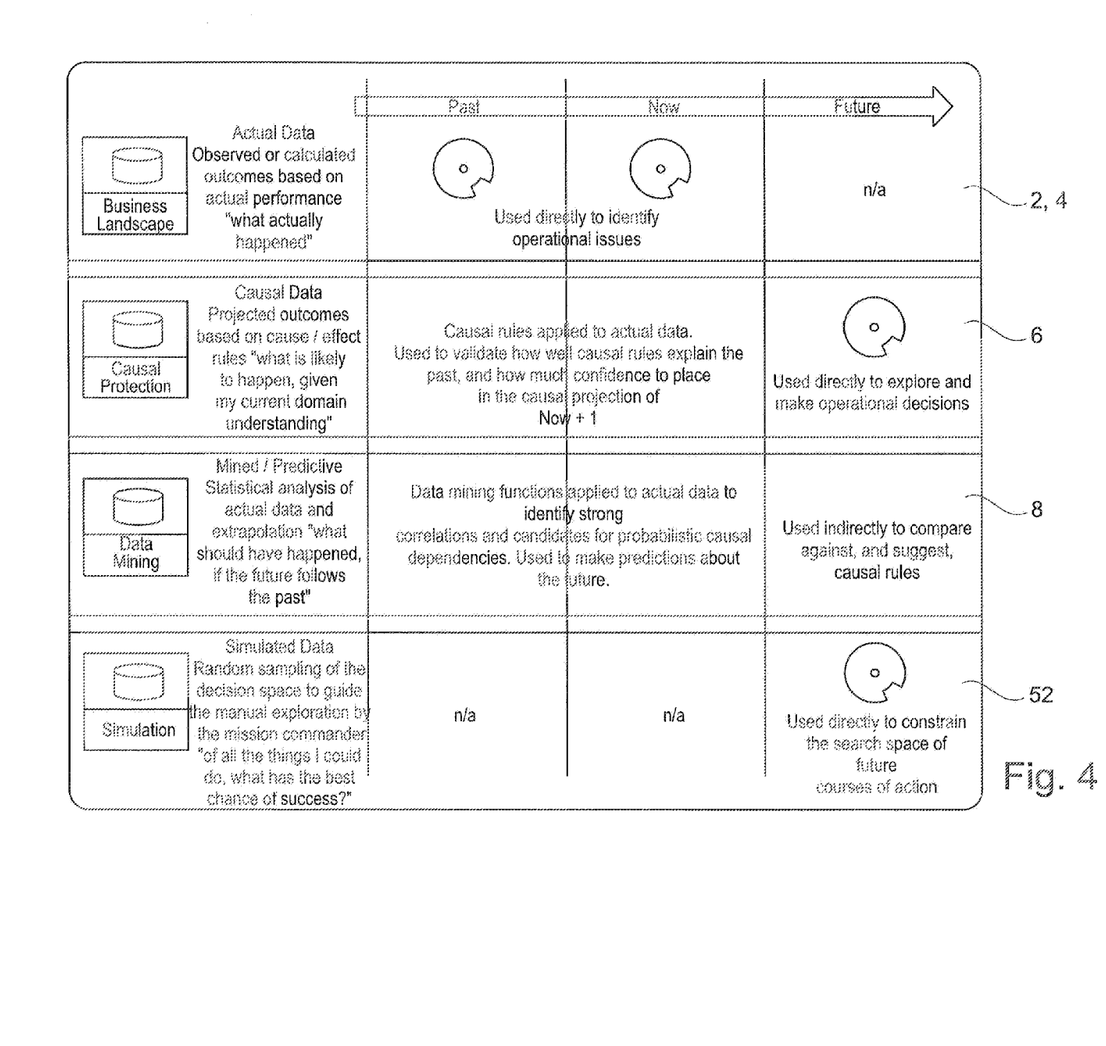
FIG. 4 illustrates the provision of the model with additional features.

FIG. 4 illustrates the further possibility of using the model to guide the "mining" of historical data and also the possibility to utilise the model in conjunction with known simulation techniques to guide the user in the selection of changes to be assessed within a scenario, typically to provide guidance on best and worst possible outcomes.

In addition to supporting decision management across related business domains, such a model is developed to represent an organisation as it currently operates, or as it is intended to operate, through a combination of extracted organisational data provided in layers 2 and 4 and available domain knowledge in relation to the organisation provided in layers 6,8. As a result of this, the user can then determine, via requests made to the model, the outcome and impact of changes to the organisation on a continuing basis. Consequently, rather than the model providing information relating to the organisation in the past or present as would be the case with conventional models based purely on operational data, the model is able to provide an indication and simulations 52 of the organisation in the future due to the use of domain knowledge information in conjunction with data. This ensures common understanding and hence collaboration across business communities, to support investigations into impact of change, and to explore and quantify alternative future options. The method described combines the benefits of structured domain knowledge with relevant live data, and relevant analytical techniques, embodied through sophisticated graphics to enable business community to manage difficult decision processes in a systematic way that accesses available evidence without being constrained by it.

The invention claimed is:

1. A model representing at least part of an organization, said model comprising:
   a plurality of interconnecting layers of information including a first, base, layer or layers which include the identity of different aspects of the organization and elements and/or properties relating to the performance of the same, said layer including data retrieved from one or more databases of the organization and/or external database sources and allocated to one or more of the aspects, elements and/or properties and wherein there is provided, a further layer which includes information identifying the causal links between the said aspects, elements and/or properties identified in the said first layer, said casual links developed with reference at least partially to information obtained from one or more human resources; and
   wherein there is provided a further layer which includes data relating to the probability of certain identified aspects, elements and/or properties and/or links between the same, occurring.

2. A model according to claim 1 wherein the data is retrieved continually from the organization and/or external sources.

3. A model according to claim 1 wherein properties of the said aspects, elements and/or properties are provided with links such that those aspects, elements and/or properties which are linked in terms of their implementation and operation within the organization are mapped to each other.

4. A model according to claim 3 wherein the first layer provides the structure for the model and which structure is substantially complied with in the second and subsequent layers.

5. A model according to claim 1 wherein the first layer includes, for each of a plurality of the aspects of the first layer, a list of any, or any combination of, the properties, elements and/or boundaries of the aspects and/or links between the same.

6. A model according to claim 1 wherein the lists are populated with data obtained from sources within and/or external to the organization to provide lead indicators and/or extrapolated lead indicators.

7. A model according to claim 1 wherein the second layer of the model includes information from experts in all, or particular aspects, of the organization and/or information from sources external to the organization to create causal links between the aspects, elements and/or properties identified in the first layer.

8. A model according to claim 1 wherein variables to allow a degree of probability to be calculated are referred to in the said further layer.

9. A model according to claim 8 wherein analytical methods are used to identify the likelihood of a predicted result occurring as a result of a decision being made whilst taking into account other aspects, elements and/or properties and/or external information.

10. A model according to claim 1 wherein there is provided a plurality of variations of the model, said variations developed with reference to one or more scenarios developed through one or more changes being made to the content in any of the layers, relating to possible future conditions of the organization and/or considerations external to the organization.

11. A method for creating a model of at least part of an organization to allow decision making to be performed with respect to said at least part of the organization represented by the model, said method comprising:
    assembling at least a first layer of the model in the form of a meta model to describe the aspects, elements and/or properties relevant to said at least part of the organization, populating the said aspects, elements and/or properties using data obtained from database sources within and/or external to the said at least part of the organization;
    identifying links between said aspects, elements and/or properties so as to identify which have an influence on the performance of each other and wherein at least one further layer is developed for the model, said further layer identifying causal effects between said identified linkages based, at least partially on information obtained from subject matter experts and/or domain knowledge.

12. A method according to claim 11 wherein the said data is retrieved continuously from the data sources within the organization and/or external sources.

13. A method according to claim 11 wherein a further layer is provided which includes information relating to the probabilistic likelihood of specified aspects, elements and/or properties and/or links between the same occurring.

14. A method according to claim 11 wherein the first layer is developed using an architectural modelling environment to describe the relevant domain of the model in terms of the type of each aspect including any, or any combination of, business objectives, activities, functions, risks, projects, systems, locations and/or interfaces, and their linkages and a measure of effectiveness.

15. A method according to claim 11 wherein graphical viewpoints are generated in response to a user request made of the model and the viewpoints are automatically refreshed in response to changes in the data provided to the model.

* * * * *